UNITED STATES PATENT OFFICE.

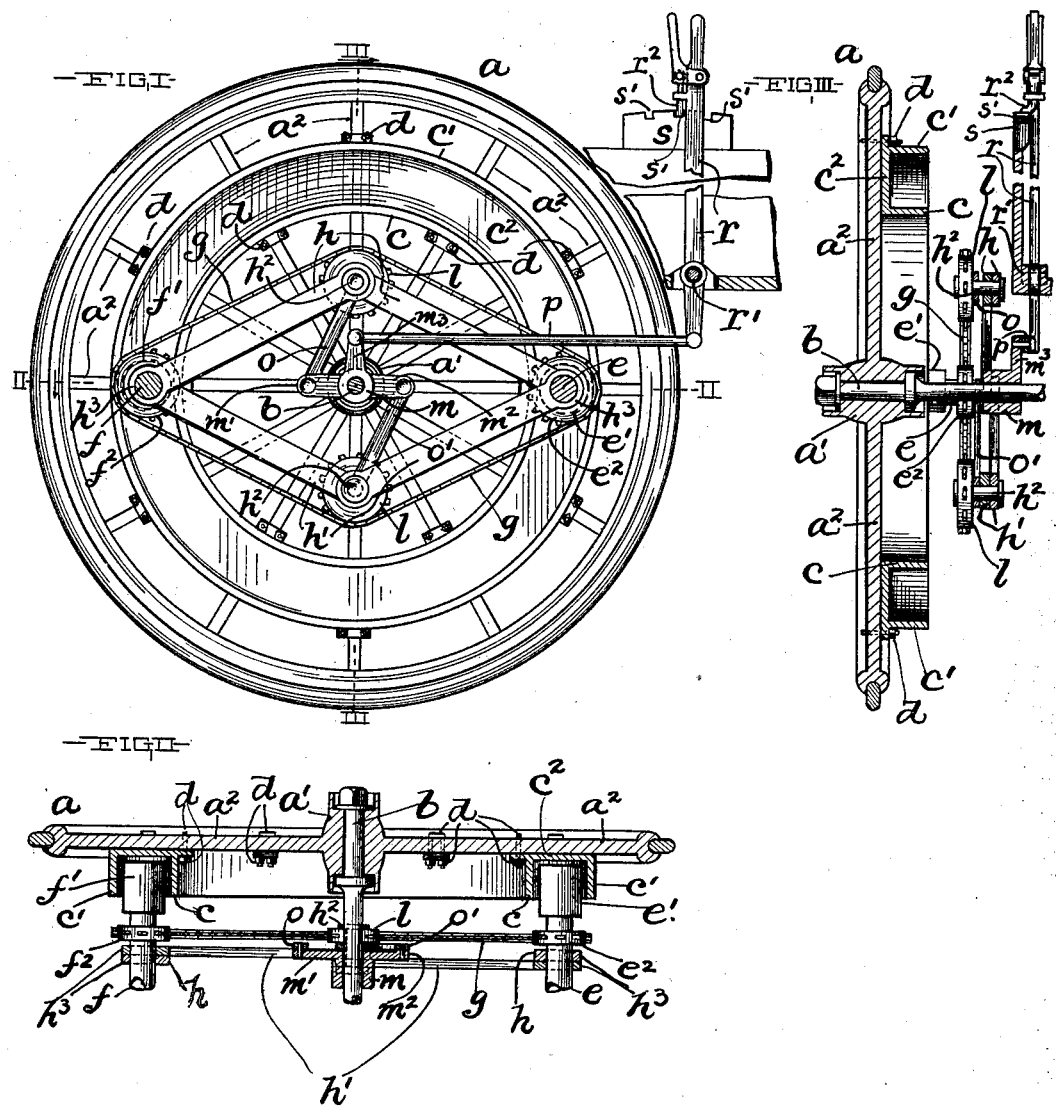

ORATUS S. FRENCH, OF FREMONT, OHIO.

POWER TRANSMITTING AND REVERSING GEAR.

SPECIFICATION forming part of Letters Patent No. 668,914, dated February 26, 1901.

Application filed November 21, 1900. Serial No. 37,280. (No model.)

*To all whom it may concern:*

Be it known that I, ORATUS S. FRENCH, a resident of Fremont, in the county of Sandusky and State of Ohio, have invented certain new and useful Improvements in Power Transmitting and Reversing Gears; and I do hereby declare the following to be a full, clear, and exact description of the invention, such as will enable others skilled in the art to which it pertains to make and use the same.

My invention relates to an improved power transmitting and reversing gear more especially suitable for use where light power is required—as, for instance, in the propulsion of automobiles.

The primary object of this invention is to provide a gear of the character indicated, that is comparatively noiseless in its operation, safe and reliable at all times, convenient, light, and inexpensive.

With this object in view the invention consists in certain features of construction and combinations of parts hereinafter described, and pointed out in the claims.

In the accompanying drawings, Figure I is a side elevation of a power transmitting and reversing gear embodying my invention. Fig. II is a section on line II II, Fig. I, looking downwardly. Fig. III is a section on line III III, Fig. I, looking to the right.

Referring to the drawings, $a$ designates a wheel to which power is to be transmitted and which constitutes a driving-wheel upon a shaft or axle $b$. The wheel $a$ illustrated is more especially suitable for use as a driving-wheel of an automobile and has a hub $a'$ mounted upon the shaft or axle $b$ in any approved manner and spokes or arms $a^2$ arranged radially and at equal intervals circumferentially of the hub.

The wheel $a$ is provided with two friction-rings $c$ and $c'$, arranged the one $c$ within and a suitable distance from the other, $c'$. Both rings $c$ and $c'$ are arranged concentrically of the axis of the wheel $a$. The rings $c$ and $c'$ are preferably formed upon and integral with an annular plate $c^2$, which is secured to the spokes or arms $a^2$ of the wheel $a$ in any approved manner and arranged, of course, concentrically of the wheel's axis. The plate $c^2$ is secured, preferably, to each spoke or arm $a^2$ of the wheel $a$, being secured at its inner edge and outer edge to alternate spokes, respectively, preferably by means of clips or fastening devices $d$.

The opposing surfaces of the rings $c$ and $c'$ constitute the friction-surfaces of the wheel $a$, and the annular space between the said surfaces accommodates the location and operation between the said surfaces of two friction-wheels $e'$ and $f'$, that are arranged diametrically opposite each other at opposite sides, respectively, of the axis of the wheel $a$ and are normally centrally between and out of engagement with the aforesaid annular friction-surfaces. The wheels $e'$ and $f'$ are formed upon an end of different shafts $e$ and $f$, respectively. The shafts $e$ and $f$ are consequently arranged at opposite sides, respectively, of the axis of the wheel $a$ and at one end extend into the annular space formed between the two friction-rings of the wheel, and each shaft within the said space is enlarged diametrically and annularly to form the friction-wheel of the said shaft. The shafts $e$ and $f$ are shiftable toward and from each other to the extent that the friction-rings of the wheel $a$ will permit. In the normal position of the parts the shafts $e$ and $f$ are arranged with their friction-wheel-forming ends centrally between the opposing surfaces of the friction-rings. Mechanism, as will hereinafter appear, is provided for shifting the shafts $e$ and $f$ toward and from each other, and obviously the wheel-forming ends of the shafts are shifted into engagement with the outer friction-ring or into contact with the inner friction-ring, according as the said shafts are shifted from or toward each other. One of the shafts $e$ or $f$ is rotated rapidly by means of a motor, (not shown,) and the said shafts are operatively connected with each other, as will hereinafter appear, so that both shafts will rotate in unison and in the same direction, and obviously the wheel $a$ will be rotated in the one direction or the other according as the shafts $e$ and $f$ are shifted into operative connection with the one or the other of the friction-rings of the said wheel.

The manner of supporting shafts is so well understood that a description or illustration of any particular construction for affording bearings for the shafts is not considered necessary in this application. It is deemed sufficient to state and show that two corresponding sprocket-wheels $e^2$ and $f^2$ are operatively mounted upon the shafts $e$ and $f$, respectively, and operatively connected together by means of a chain $g$. The mechanism employed for shifting the shafts $e$ and $f$, and consequently the friction-wheels $e'$ and $f'$, toward and from each other comprises, preferably, two toggle-joints $h$ and $h'$, arranged normally in the form of a diamond and equidistant from the shaft or axle $b$. The toggle-joints are therefore arranged with their knuckles at opposite sides, respectively, of and equidistant from the shaft or axle $b$ centrally between the shafts $e$ and $f$. Each toggle-joint has its two links, at the outer or separated ends of the links, connected to the different shafts $e$ and $f$, respectively, and the connection formed between each of the said shafts and the connected toggle-joint link consists, preferably, of a sleeve $h^3$, loosely mounted upon the shaft and formed upon or connected with the said link in any approved manner. The pivotal pin $h^2$ of the knuckle of each toggle-joint is arranged parallel with shafts $e$ and $f$, and the two links of each toggle-joint diverge from the knuckle of the joint toward their connection with the different shafts $e$ and $f$, respectively. The pivotal pin of each toggle-joint knuckle is provided with a sprocket-wheel $l$, that corresponds with the sprocket-wheels $e^2$ and $f^2$, already referred to. The wheels $l$ and $l$ are arranged at the inner side of and engage and guide the endless chain $g$ and hold the chain taut—that is, prevent the chain from sagging during the operation of the toggle-joints.

A sleeve or collar $m$ is loosely mounted upon the shaft or axle $b$ and provided with two radially-arranged corresponding arms $m'$ and $m^2$, formed upon and at opposite sides, respectively, of the sleeve. In the normal position of the parts the arms project directly toward the different shafts $e$ and $f$, respectively. The two arms $m'$ and $m^2$ are correspondingly operatively connected, by means of rods or links $o$ and $o'$, respectively, with the different toggles $h$ and $h'$, respectively, at the axis of the knuckle of the respective toggle. The sleeve or collar $m$ is provided with a lever $m^3$, arranged centrally between the toggle-connected arms of the sleeve, which lever $m^3$ is operatively connected, by means of a rod or link $p$, with the lower end of the upright operating-lever $r$, that is fulcrumed to any suitable object or support, (not shown,) preferably a short distance from its connection with the rod or link $p$, as at $r'$, and is normally in its intermediate position, wherein any approved form of latch $r^2$, that is suitably connected with the lever, engages the middle notch of a suitably-applied segment $s$, having three notches $s' s' s'$, and the arrangement of the parts is such that when the operating-lever is in its intermediate position the friction-wheel-forming ends of the shafts $e$ and $f$ will be in their intermediate and inoperative position, and the said shafts will be simultaneously shifted into operative connection with the one or the other of the friction-rings of the wheel $a$ according as the operating-lever is shifted into the one or the other of its extreme positions, and of course the latch $r'$ is preparatory to shifting the lever $r$ in the one direction or the other disengaged from the engaging notch of the segment, and the latch is caused to engage the one or the other of the outer notches of the segment according as the operating-lever is shifted into the one or the other of its extreme positions.

By the power transmitting and reversing gear hereinbefore described the power is applied by means of uniformly-operating friction-wheels at diametrically opposite sides, respectively, of the axis of the wheel $a$, and the said wheel is driven in the one direction or the other according as the friction-wheels are shifted into engagement with the one or the other of the friction-rings of the said wheel, and the mechanism controlling the simultaneous application of power to the wheel $a$ at diametrically opposite points is light, durable, and inexpensive and not only conveniently operated, but safe and reliable in its operation at all times.

What I claim is—

1. The combination, with a wheel provided with two friction-rings arranged concentrically of the axis of the wheel, one within and a suitable distance from the other, of two corresponding friction-wheels arranged within the annular space formed between the aforesaid rings at opposite sides, respectively, of the axis of the ring-bearing wheel and normally out of engagement with the friction-rings, but movable laterally into frictional engagement with the one or the other of the said rings, and mechanism for simultaneously shifting the friction-wheels laterally toward or from each other.

2. The combination, with a wheel having two annular friction-surfaces arranged concentrically of the axis of the wheel, and one of the said surfaces being sufficiently smaller diametrically than the other to form an annular space between them, of two suitably-operated friction-wheels arranged within the said space at opposite sides, respectively, of the axis of the wheel and normally out of engagement with the aforesaid friction-surfaces but shiftable toward and from each other, a suitably-applied and suitably-operated toggle-joint or toggle instrumental in simultaneously shifting the friction-wheels toward or from each other, substantially as and for the purpose set forth.

3. The combination, with a wheel having two annular friction-surfaces arranged concentrically of the wheel's axis, one of the said surfaces being sufficiently smaller diametrically than the other to form an annular space between them, and two suitably-operated friction-wheels arranged within the said space at opposite sides, respectively, of the axis of the wheel and normally out of engagement with the aforesaid friction-surfaces but shiftable toward and from each other, of two suitably-operated toggle-joints arranged in the form of a diamond around the axis of the first-mentioned wheel and instrumental in simultaneously shifting the friction-wheels toward or from each other, substantially as and for the purpose set forth.

4. The combination, with a wheel having two annular friction-surfaces arranged concentrically of the wheel's axis, one of the said surfaces being sufficiently smaller diametrically than the other to form an annular space between them, and two suitably-operated friction-wheels arranged within the said space at opposite sides, respectively, of the axis of the wheel and normally out of engagement with the friction-surfaces but shiftable toward and from each other, of two correspondingly-operating toggle-joints disposed in the form of a diamond around the axis of the first-mentioned wheel and instrumental in simultaneously shifting the friction-wheels toward or from each other, two corresponding sprocket-wheels operatively connected with the different friction-wheels, respectively, an endless chain operatively connecting together the said sprocket-wheels, and two sprocket-wheels carried by the toggle-joints at the knuckles of the different toggle-joints, respectively, and engaging the inner side of and thereby guiding the aforesaid endless chain.

5. The combination, with a wheel having two annular friction-surfaces arranged concentrically of the axis of the wheel, and one of the said surfaces being sufficiently smaller diametrically than the other to form an annular space between them, of two shafts arranged at opposite sides, respectively, of the axis of the wheel and shiftable toward and from each other, two friction-wheels formed upon the different shafts, respectively, within the aforesaid space but normally out of engagement with the aforesaid friction-surfaces, such an operative connection between the said shafts as will render them capable of operating in unison, sleeves mounted upon the shafts, and a toggle-joint or toggle instrumental in simultaneously shifting the shafts toward or from each other and suitably connected with the aforesaid sleeves.

6. The combination, with a wheel having two annular friction-surfaces arranged concentrically of the axis of the wheel, and one of the said surfaces being sufficiently smaller diametrically than the other to form an annular space between them, of two shiftable shafts extending into the said space at opposite sides, respectively, of the axis of the aforesaid wheel, two friction-wheels formed upon the different shafts, respectively, within the aforesaid space and normally out of engagement with the aforesaid friction-surfaces, sleeves loosely mounted upon the shafts, two correspondingly-operating toggle-joints forming a connection between the said sleeves and having their links disposed in the form of a diamond around and equidistant from the axis of the first-mentioned wheel, and such an operative connection between the shafts as will render them capable of operating in unison.

7. The combination, with a wheel having two annular friction-surfaces arranged concentrically of the axis of the wheel, and one of the said surfaces being sufficiently smaller diametrically than the other to form an annular space between them, of two shafts shiftable toward and from each other and extending into the aforesaid space at opposite sides, respectively, of the axis of the wheel, two friction-wheels formed upon the different shafts, respectively, within the aforesaid space and normally out of engagement with the aforesaid friction-surfaces, corresponding sprocket-wheels operatively mounted upon the different shafts, respectively, an endless chain operatively connecting the said sprocket-wheels together, sleeves loosely mounted upon the shafts, two toggle-joints between the said sleeves at opposite sides, respectively, of the axis of the first-mentioned wheel, sprocket-wheels supported from the toggle-joints at the knuckles of the joints and engaging the inner side of and guiding the endless chain, and mechanism for simultaneously and correspondingly operating the toggle-joints to establish operative engagement simultaneously between each friction-wheel and the one or the other of the aforesaid annular friction-surfaces.

8. The combination, with a shaft or axle and the wheel mounted upon the said shaft or axle and having two annular friction-surfaces arranged concentrically of the axis of the wheel, and one of said surfaces being sufficiently smaller diametrically than the other to form an annular space between them, of two shafts shiftable toward and from each other and extending into the aforesaid space at opposite sides, respectively, of the axis of the wheel, two friction-wheels formed upon the different shiftable shafts, respectively, within the aforesaid space and normally out of engagement with the aforesaid friction-surfaces, such an operative connection between the last-mentioned shafts as will render them capable of being rotated in unison, two toggle-joints instrumental in shifting the friction-wheel shafts toward and from each other and arranged at opposite sides, respectively, of the first-mentioned shaft, a sleeve loosely mounted upon the first-mentioned shaft and having two arms projecting toward the different friction-wheel shafts, respectively, two rods or links operatively connecting the different sleeve-arms, respectively, with the knuckles of the different toggle-joints, respectively, and mechanism for turning or oscillating the said sleeve, substantially as and for the purpose set forth.

9. The combination of a shaft or axle, a wheel mounted upon the said shaft or axle and having radially-arranged spokes or arms, and an annular plate arranged concentrically of the wheel's axis and secured, at its inner edge and outer edge, to alternate spokes or arms of the wheel, which plate is provided with two annular flanges arranged concentrically of the wheel's axis and formed at opposite edges, respectively, of the plate so as to form an annular space between the flanges, two corresponding friction-wheels arranged within the said space at opposite sides, respectively, of the axis of the wheel but normally out of engagement with the aforesaid flanges, such an operative connection between the friction-wheels as will render them capable of being rotated in unison, and mechanism for simultaneously and correspondingly shifting the friction-wheels toward or from each other, substantially as and for the purpose set forth.

Signed by me at Fremont, Ohio, this 16th day of November, 1900.

ORATUS S. FRENCH.

Witnesses:
  D. B. LOVE,
  A. E. CULBERT.